US012585099B2

(12) United States Patent
Guo

(10) Patent No.: US 12,585,099 B2
(45) Date of Patent: Mar. 24, 2026

(54) MICROSCOPE OBJECTIVE LENS

(71) Applicant: AAC OPTICS (CHANGZHOU) CO., LTD., Changzhou City (CN)

(72) Inventor: Zhanli Guo, Changzhou (CN)

(73) Assignee: AAC OPTICS (CHANGZHOU) CO., LTD., Changzhou City (CN)

( * ) Notice: Subject to any disclaimer, the term of this patent is extended or adjusted under 35 U.S.C. 154(b) by 328 days.

(21) Appl. No.: 18/393,606

(22) Filed: Dec. 21, 2023

(65) Prior Publication Data

US 2024/0427130 A1 Dec. 26, 2024

(30) Foreign Application Priority Data

Jun. 21, 2023 (CN) .......................... 202310738587.5

(51) Int. Cl.
*G02B 21/02* (2006.01)
*G02B 9/64* (2006.01)

(52) U.S. Cl.
CPC ............... *G02B 21/02* (2013.01); *G02B 9/64* (2013.01)

(58) Field of Classification Search
USPC ......................................................... 359/656
See application file for complete search history.

(56) References Cited

U.S. PATENT DOCUMENTS

| | | | | |
|---|---|---|---|---|
| 7,046,451 B2 * | 5/2006 | Mandai | .................. | G02B 21/02 359/784 |
| 7,199,938 B2 * | 4/2007 | Fujimoto | ............... | G02B 21/33 359/656 |
| 10,281,703 B2 * | 5/2019 | Toshi | ..................... | G02B 21/02 |
| 2015/0146304 A1 * | 5/2015 | Yamawaki | ............. | G02B 21/02 359/656 |
| 2017/0184830 A1 * | 6/2017 | Akahane | ........... | G02B 27/0025 |
| 2024/0045192 A1 * | 2/2024 | Takagi | .................. | G02B 21/00 |

* cited by examiner

*Primary Examiner* — Darryl J Collins
(74) *Attorney, Agent, or Firm* — Wiersch Law Group

(57) ABSTRACT

The present application relates to the field of optical lenses and discloses a microscope objective lens. The microscope objective lens includes in order from the emitting side to the objective side: a first lens, a second lens, a third lens, a fourth lens, a fifth lens, a sixth lens, a seventh lens, an eighth lens, a ninth lens, a tenth lens, an eleventh lens, and a twelfth lens, and the following relationship expressions are satisfied: $1.50 \leq NA*f \leq 3.00$; $0.15 \leq d4/TTL \leq 0.25$; $5.00 \leq f12/f \leq 15.00$; $-7.00 \leq (R23+R24)/(R23-R24) \leq -1.50$. The microscope objective lens of the present application is capable of being used as a lens of the microscope with good optical performance, a large numerical aperture, and a wide working band with a magnification of 50 times.

16 Claims, 9 Drawing Sheets

10

Axial Aberration

Millimeter

Magnification Chromatic Aberration

Micron

Axial Aberration

Magnification Chromatic Aberration

Axial Aberration

Magnification Chromatic Aberration

MICROSCOPE OBJECTIVE LENS

TECHNICAL FIELD

The present application relates to the technical field of optical lenses, in particular to a microscope objective lens applicable in a device such as a microscope.

BACKGROUND

In recent years, there has been a growing demand for microscope lenses. However, conventional microscope lenses often exhibit distortions within their microscopic range due to optical structural constraints. Additionally, the length of microscope lenses is inevitably affected by the presence of multiple lenses, and elongated structures may result in a shorter working distance. The magnification is also influenced by the working distance, which may be inconvenient for operators.

With the advancement of technology and the increasing diversity of user demands, there is a growing need in scientific research for microscope lenses with improved observation quality. There is an urgent demand for microscope lenses that exhibit excellent optical characteristics, low distortion, and a long working distance.

SUMMARY

In response to the above problems, the present application aims to provide a microscope objective lens, which can provide a microscope objective lens with good optical performance, a large numerical aperture, and a wide working band with a magnification of 50 times.

In order to solve the above technical problem, the present application proposes a microscope objective lens, comprising in order from an emitting side to an objective side: a first lens, a second lens, a third lens, a fourth lens, a fifth lens, a sixth lens, a seventh lens, an eighth lens, a ninth lens, a tenth lens, an eleventh lens, and a twelfth lens; wherein a numerical aperture is NA; a focal length of the microscope objective lens is f; an air spacing between the second lens and the third lens on an optical axis is d4; an optical total length of the microscope objective lens is TTL; a focal length of the twelfth lens is f12; a central radius of curvature of an emitting surface of the twelfth lens is R23; a central radius of curvature of an objective surface of the twelfth lens is R24, and the following relationship expressions are satisfied: $1.50 \leq NA*f \leq 3.00$; $0.15 \leq d4/TTL \leq 0.25$; $5.00 \leq f12/f \leq 15.00$; $-7.00 \leq (R23+R24)/(R23-R24) \leq -1.50$.

In one embodiment, a focal length of the eleventh lens is f11; a focal length of a combined lens formed by gluing the ninth lens and the tenth lens to each other is f9_10, and the following relationship expression is satisfied: $0.20 \leq f11/f9\_10 \leq 0.90$.

In one embodiment, a distance from the objective surface of the twelfth lens to an objective surface of the microscope objective lens is WD, and the following relationship expression is satisfied: $2.30 \leq WD/f \leq 3.30$.

In one embodiment, an objective surface of the first lens is convex at a proximal-axis position; a focal length of the first lens is f1; a central radius of curvature of an emitting surface of the first lens is R1; a central radius of curvature of an objective surface of the first lens is R2; an on-axis thickness of the first lens is d1, and the following relationship expressions are satisfied: $-3.96 \leq f1/f \leq -0.73$; $0.34 \leq (R1+R2)/(R1-R2) \leq 1.78$; $0.00 \leq d1/TTL \leq 0.06$.

In one embodiment, an emitting surface of the second lens is convex at a proximal-axis position, and an objective surface of the second lens is convex at a proximal-axis position; a focal length of the second lens is f2; a central radius of curvature of the emitting surface of the second lens is R3; a central radius of curvature of the objective surface of the second lens is R4; an on-axis thickness of the second lens is d3, and the following relationship expressions are satisfied: $1.10 \leq f2/f \leq 4.09$; $-12.23 \leq (R3+R4)/(R3-R4) \leq 15.86$; and $0.00 \leq d3/TTL \leq 0.15$.

In one embodiment, an emitting surface of the third lens is convex at a proximal-axis position, and an objective surface of the third lens is concave at a proximal-axis position; a focal length of the third lens is f3; a central radius of curvature of the emitting surface of the third lens is R5; a central radius of curvature of the objective surface of the third lens is R6; an on-axis thickness of the third lens is d5, and the following relationship expressions are satisfied: $1.97 \leq f3/f \leq 9.06$; $0.04 \leq (R5+R6)/(R5-R6) \leq 0.72$; $0.01 \leq d5/TTL \leq 0.13$.

In one embodiment, an emitting surface of the fourth lens is concave at a proximal-axis position, and an objective surface of the fourth lens is convex at a proximal-axis position; a focal length of the fourth lens is f4; a central radius of curvature of the emitting surface of the fourth lens is R7; a central radius of curvature of the objective surface of the fourth lens is R8; an on-axis thickness of the fourth lens is d7, and the following relationship expressions are satisfied: $-7.48 \leq f4/f \leq -1.53$; $-0.51 \leq (R7+R8)/(R7-R8) \leq 0.54$; $0.00 \leq d7/TTL \leq 0.02$.

In one embodiment, an emitting surface of the fifth lens is convex at a proximal-axis position, and an objective surface of the fifth lens is concave at a proximal-axis position; a focal length of the fifth lens is f5; a central radius of curvature of the emitting surface of the fifth lens is R9; a central radius of curvature of the objective surface of the fifth lens is R10; an on-axis thickness of the fifth lens is d9, and the following relationship expressions are satisfied: $1.50 \leq f5/f \leq 8.84$; $-0.08 \leq (R9+R10)/(R9-R10) \leq 0.27$; $0.03 \leq d9/TTL \leq 0.19$.

In one embodiment, an emitting surface of the sixth lens is convex at a proximal-axis position, and an objective surface of the sixth lens is concave at a proximal-axis position; a focal length of the sixth lens is f6; a central radius of curvature of the emitting surface of the sixth lens is R11; a central radius of curvature of the objective surface of the sixth lens is R12; an on-axis thickness of the sixth lens is d11, and the following relationship expressions are satisfied: $4.15 \leq f6/f \leq 17.66$; $0.15 \leq (R11+R12)/(R11-R12) \leq 0.84$; $0.03 \leq d11/TTL \leq 0.19$.

In one embodiment, an emitting surface of the seventh lens is concave at a proximal-axis position, and an objective surface of the seventh lens is convex at a proximal-axis position; a focal length of the seventh lens is f7; a central radius of curvature of the emitting surface of the seventh lens is R13; a central radius of curvature of the objective surface of the seventh lens is R14; an on-axis thickness of the seventh lens is d13, and the following relationship expressions are satisfied: $-9.42 \leq f7/f \leq -1.96$; $-0.78 \leq (R13+R14)/(R13-R14) \leq 0.48$; $0.00 \leq d13/TTL \leq 0.08$.

In one embodiment, an emitting surface of the eighth lens is convex at a proximal-axis position, and an objective surface of the eighth lens is concave at a proximal-axis position; a focal length of the eighth lens is f8; a central radius of curvature of the emitting surface of the eighth lens is R15; a central radius of curvature of the objective surface of the eighth lens is R16; an on-axis thickness of the eighth lens is d15, and the following relationship expressions are satisfied: $2.53 \leq f8/f \leq 14.77$; $-0.84 \leq (R15+R16)/(R15-R16) \leq 0.35$; $0.01 \leq d15/TTL \leq 0.11$.

In one embodiment, an emitting surface of the ninth lens is convex at a proximal-axis position, and an objective surface of the ninth lens is concave at a proximal-axis position; a focal length of the ninth lens is f9; a central radius of curvature of the emitting surface of the ninth lens is R17; a central radius of curvature of the objective surface of the ninth lens is R18; an on-axis thickness of the ninth lens is d17, and the following relationship expressions are satisfied: $2.16 \leq f9/f \leq 16.16$; $0.00 \leq (R17+R18)/(R17-R18) \leq 0.46$; $0.01 \leq d17/TTL \leq 0.13$.

In one embodiment, an emitting surface of the tenth lens is concave at a proximal-axis position, and an objective surface of the tenth lens is concave at a proximal-axis position; a focal length of the tenth lens is f10; a central radius of curvature of the emitting surface of the tenth lens is R19; a central radius of curvature of the objective surface of the tenth lens is R20; an on-axis thickness of the tenth lens is d19, and the following relationship expressions are satisfied: $-28.09 \leq f10/f \leq -4.24$; $-4.47 \leq (R19+R20)/(R19-R20) \leq -1.17$; $0.01 \leq d19/TTL \leq 0.15$.

In one embodiment, an emitting surface of the eleventh lens is convex at a proximal-axis position; a central radius of curvature of the emitting surface of the eleventh lens is R21; a central radius of curvature of an objective surface of the eleventh lens is R22; an on-axis thickness of the eleventh lens is d21, and the following relationship expressions are satisfied: $5.04 \leq f11/f \leq 22.28$; $-2.75 \leq (R21+R22)/(R21-R22) \leq -0.01$; $0.01 \leq d21/TTL \leq 0.09$.

In one embodiment, the emitting surface of the twelfth lens is convex at a proximal-axis position, and the objective surface of the twelfth lens is convex at a proximal-axis position; an on-axis thickness of the twelfth lens is d23, and the following relationship expressions are satisfied: $2.50 \leq f12/f \leq 22.48$; $0.02 \leq d23/TTL \leq 0.09$.

In an embodiment, the optical total length TTL of the microscope objective lens is less than or equal to 143.21 mm.

The beneficial effect of the present application is that the microscope objective lens of the present application has excellent optical characteristics and is characterized by a large numerical aperture, a wide working band, and a magnification of 50 times.

DETAILED DESCRIPTION OF THE EMBODIMENTS

In order to make the objects, technical solutions, and advantages of the present application clearer, various embodiments of the present application will be described in detail below in connection with the accompanying drawings. However, those of ordinary skill in the art can understand that in the various embodiments of the present application, a number of technical details have been proposed in order to enable the reader to better understand the present application, and even without these technical details and various variations and modifications based on the following various embodiments, the technical solution claimed to be protected by the present application can be realized.

First Embodiment

Figure 1:
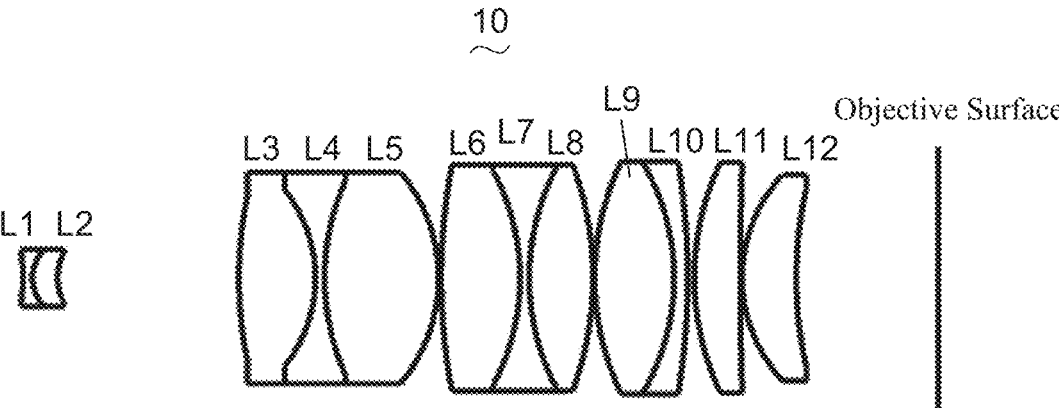
FIG. 1 is a structural schematic diagram of a microscope objective lens according to the first embodiment of the present application.

As shown in the accompanying drawings, the present application provides a microscope objective lens 10. FIG. 1 shows a microscope objective lens 10 according to the first embodiment of the present application, including twelve lenses. Specifically, the microscope objective lens 10, in order from an emitting side to an objective side, includes a first lens L1, a second lens L2, a third lens L3, a fourth lens L4, a fifth lens L5, a sixth lens L6, a seventh lens L7, an eighth lens L8, a ninth lens L9, a tenth lens L10, an eleventh lens L11, a twelfth lens L12, and an objective surface.

In this embodiment, the first lens L1 is made of glass material, the second lens L2 is made of glass material, the third lens L3 is made of glass material, the fourth lens L4 is made of glass material, the fifth lens L5 is made of glass material, the sixth lens L6 is made of glass material, the seventh lens L7 is made of glass material, the eighth lens L8 is made of glass material, the ninth lens L9 is made of glass material, the tenth lens L10 is made of glass material, the eleventh lens L11 and the twelfth lens L12 are made of glass material. This helps to improve system performance and system stability. In other embodiments, these lenses may also be made of other materials.

It is defined that the numerical aperture is NA, and a focal length of the microscope objective lens 10 is f. The following relationship expression is satisfied: $1.50 \leq NA*f \leq 3.00$, in which a range of the product of the numerical aperture NA of the objective surface and the focal length f is specified. Within the range of the relationship expression, the magnification of the microscope is maintained, and a wider field of view is obtained.

It is defined that an air spacing between the second lens L2 and the third lens L3 on the optical axis is d4, and an optical total length of the microscope objective lens 10 is TTL. The following relationship expression is satisfied: $0.15 \leq d4/TTL \leq 0.25$, in which a ratio of the air spacing between the first lens group and the second lens group to the total length of the system is specified. Within the range of the relationship expression, it is conducive to realizing a high magnification.

It is defined that the focal length of the twelfth lens L12 is f12, and the following relationship expression is satisfied: $5.00 \leq f12/f \leq 15.00$, in which a ratio of the focal length of the twelfth lens f12 to the focal length of the system f is specified. The reasonable distribution of the focal length can effectively control the degree of deflection of light into the lens, and can effectively reduce the imaging aberration and chromatic aberration.

It is defined that a central radius of curvature of an emitting surface of the twelfth lens L12 is R23, and a central radius of curvature of an objective surface of the twelfth lens L12 is R24. The following relationship expression is satisfied: $-7.00 \leq (R23+R24)/(R23-R24) \leq -1.50$, in which the shape of the objective surface of the twelfth lens L12 is specified, so that the degree of deviation of the light entering the lens can be effectively controlled, and aberration and chromatic aberration can be effectively reduced. The aberration $|LC| \leq 3.0$ μm.

It is defined that the focal length of the eleventh lens L11 is f11, and a focal length of the combined lens formed by gluing the ninth lens L9 and the tenth lens L10 to each other is f9_10. The following relationship expression is satisfied: $0.20 \leq f11/f9\_10 \leq 0.90$, in which the ratio of the focal lengths of the eleventh lens L11 of the objective surface to the combined lens after the eleventh lens L11 is specified. By reasonably allocating the focal lengths of light of the allocation system, it is possible to make light propagate smoothly, so that the system has better imaging quality and lower sensitivity.

It is defined that a distance from the objective surface of the twelfth lens L12 to the objective surface is WD, and the following relationship expression is satisfied: $2.30 \leq WD/f \leq 3.30$, in which a ratio of the working distance WD to the focal length f of the system is specified. Within the range of the relationship expression, a proper distance between the microscope objective lens 10 and the object can be ensured, so as to make the micro-objective lens have good operability.

In this embodiment, the emitting surface of the first lens L1 is concave at a proximal-axis position, the objective surface thereof is convex at a proximal-axis position, and the first lens L1 has a negative bending force. In other embodiments, the emitting surface and the objective surface of the first lens L1 may also be set to other concave and convex distributions.

It is defined that the integral focal length of the microscope objective lens 10 is f, and the focal length of the first lens L1 is f1. $-3.96 \leq f1/f \leq -0.73$, in which a ratio of the focal length of the first lens L1 to the integral focal length is specified. Within the specified range, the first lens L1 has an appropriate negative refractive force, which is conducive to controlling the optical total length of the microscope objective lens 10. In an embodiment, $-2.47 \leq f1/f \leq -0.92$ is satisfied.

A radius of curvature of the emitting surface of the first lens L1 is R1, and a radius of curvature of the objective surface of the first lens L1 is R2. The following relationship expression is satisfied: $0.34 \leq (R1+R2)/(R1-R2) \leq 1.78$, in which the shape of the first lens is reasonably controlled, so that the first lens is able to efficiently correct the systematic spherical aberration. In an embodiment, $0.55 \leq (R1+R2)/(R1-R2) \leq 1.42$ is satisfied.

An on-axis thickness of the first lens L1 is d1, and the optical total length of the microscope objective lens is TTL. The following relationship expression is satisfied: $0.00 \leq d1/TTL \leq 0.06$, which is conducive to reasonably controlling the optical total length of the microscope objective lens 10. In an embodiment, $0.01 \leq d1/TTL \leq 0.05$ is satisfied.

In this embodiment, an emitting surface of the second lens L2 is convex at a proximal-axis position, an objective surface of the second lens L2 is convex at a proximal-axis position, and the second lens L2 has a positive refractive force. In other embodiments, the emitting surface and the objective surface of the second lens L2 may also be set to other concave and convex distributions.

It is defined that the integral focal length of the microscope objective lens 10 is f, and a focal length of the second lens L2 is f2. $1.10 \leq f2/f \leq 4.09$, in which a ratio of the focal length of the second lens L2 to the integral focal length is specified. Within the specified range, the second lens L2 has an appropriate positive refractive force, which is conducive to correcting the aberration of the optical system. In an embodiment, $1.76 \leq f2/f \leq 3.28$ is satisfied.

A radius of curvature of the emitting surface of the second lens L2 is R3, and a radius of curvature of the objective surface of the second lens L2 is R4. The following relationship expression is satisfied: $-12.23 \leq (R3+R4)/(R3-R4) \leq 15.86$, in which the shape of the second lens L2 is specified, which is conducive to correcting the problem of on-axis chromatic aberration when it is within the range. In an embodiment, $-7.65 \leq (R3+R4)/(R3-R4) \leq 12.69$ is satisfied.

An on-axis thickness of the second lens L2 is d3, and the total optical length of the microscope objective lens 10 is TTL. The following relationship expression is satisfied: $0.00 \leq d3/TTL \leq 0.15$, in which a ratio of the on-axis thickness of the second lens L2 to the total optical length TTL of the microscope objective lens 10 is specified, which is conducive to reasonable controlling the total optical length of the microscope objective lens 10. In an embodiment, $0.01 \leq d3/TTL \leq 0.12$ is satisfied.

In this embodiment, an emitting surface of the third lens L3 is convex at a proximal-axis position, and an objective surface thereof is concave at a proximal-axis position, and the third lens L3 has a positive refractive force. In other embodiments, the emitting surface and the objective surface of the third lens L3 may also be set to other concave and convex distributions.

It is defined that the integral focal length of the microscope objective lens 10 is f, and a focal length of the third lens L3 is f3. $1.97 \leq f3/f \leq 9.06$, in which a ratio of the focal length of the third lens L3 to the integral focal length is specified. Within the specified range, the third lens L3 has an appropriate positive refractive force, which enables the system to have better imaging quality and lower sensitivity through a reasonable distribution of optical focal length. In an embodiment, $3.15 \leq f3/f \leq 7.25$ is satisfied.

A radius of curvature of the emitting surface of the third lens L3 is R5, and a radius of curvature of the objective surface of the third lens L3 is R6. The following relationship expression is satisfied: $0.04 \leq (R5+R6)/(R5-R6) \leq 0.72$, in which the shape of the third lens L3 can be effectively controlled, which is conducive to molding the third lens L3 and avoiding poor molding and stress generation due to the excessively large surface curvature of the third lens L3. In an embodiment, $0.06 \leq (R5+R6)/(R5-R6) \leq 0.58$ is satisfied.

An on-axis thickness of the third lens L3 is d5, and the optical total length of the microscope objective lens 10 is TTL. The following relationship expression is satisfied: $0.01 \leq d5/TTL \leq 0.13$, which is conducive to reasonably controlling the optical total length of the microscope objective lens 10. In an embodiment, $0.01 \leq d5/TTL \leq 0.10$ is satisfied.

In this embodiment, an emitting surface of the fourth lens L4 is concave at a proximal-axis position, and an objective surface thereof is convex at a proximal-axis position, and the fourth lens L4 has a negative bending force. In other embodiments, the emitting surface and the objective surface of the fourth lens L4 may also be set to other concave and convex distributions.

It is defined that the integral focal length of the microscope objective lens 10 is f, and a focal length of the fourth lens L4 is f4. $-7.48 \leq f4/f \leq -1.53$, in which a ratio of the focal length of the fourth lens L4 to the integral focal length is specified. Within the specified range, the fourth lens L4 has an appropriate negative refractive force, which enables the system to have better imaging quality and lower sensitivity through a reasonable distribution of optical focal length. In an embodiment, $-4.67 \leq f4/f \leq -1.92$ is satisfied.

A radius of curvature of the emitting surface of the fourth lens L4 is R7, and a radius of curvature of the objective surface of the fourth lens L4 is R8. The following relationship expression is satisfied: $-0.51 \leq (R7+R8)/(R7-R8) \leq 0.54$, in which the shape of the fourth lens L4 is specified, which is conducive to correcting the problem of on-axis chromatic aberration when it is within the range. In an embodiment, $-0.32 \leq (R7+R8)/(R7-R8) \leq 0.43$ is satisfied.

An on-axis thickness of the fourth lens L4 is d7, and an optical total length of the microscope objective lens 10 is TTL. The following relationship expression is satisfied: $0.00 \leq d7/TTL \leq 0.02$, in which a ratio of the on-axis thickness of the fourth lens L4 to the optical total length TTL of the microscope objective lens 10 is specified, which is conducive to controlling the optical total length of the microscope objective lens 10. In an embodiment, $0.01 \leq d7/TTL \leq 0.01$ is satisfied.

In this embodiment, an emitting surface of the fifth lens L5 is convex at a proximal-axis position, and an objective surface thereof is concave at a proximal-axis position, and the fifth lens L5 has a positive refractive force. In other embodiments, the emitting surface and the objective surface of the fifth lens L5 may also be set to other concave and convex distributions.

It is defined that the integral focal length of the microscope objective lens 10 is f, and a focal length of the fifth lens L5 is f5. $1.50 \leq f5/f \leq 8.84$, in which a ratio of the focal length of the fifth lens L5 to the integral focal length is specified. Within the specified range, the fifth lens L5 has an appropriate positive refractive force, and the limitation of the fifth lens L5 can effectively make the light angle of the camera lens flat and reduce the tolerance sensitivity. In an embodiment, $2.40 \leq f5/f \leq 7.07$ is satisfied.

A radius of curvature of the emitting surface of the fifth lens L5 is R9, and a radius of curvature of the objective surface of the fifth lens L5 is R10. The following relationship expression is satisfied: $-0.08 \leq (R9+R10)/(R9-R10) \leq 0.27$, in which the shape of the fifth lens L5 is specified, which is conducive to correcting the problem of on-axis chromatic aberration when it is within the range. In an embodiment, $-0.05 \leq (R9+R10)/(R9-R10) \leq 0.22$ is satisfied.

An on-axis thickness of the fifth lens L5 is d9, and the optical total length of the microscope objective lens 10 is TTL. The following relationship expression is satisfied: $0.03 \leq d9/TTL \leq 0.19$, which is conducive to controlling the optical total length of the microscope objective lens 10. In an embodiment, $0.04 \leq d9/TTL \leq 0.15$ is satisfied.

In this embodiment, an emitting surface of the sixth lens L6 is convex at a proximal-axis position, and an objective surface thereof is concave at a proximal-axis position, and the sixth lens L6 has a positive refractive force. In other embodiments, the emitting surface and the objective surface of the sixth lens L6 may also be set to other concave and convex distributions.

It is defined that the integral focal length of the microscope objective lens 10 is f, and a focal length of the sixth lens L6 is f6. $4.15 \leq f6/f \leq 17.66$, in which a ratio of the focal length of the sixth lens L6 to the overall focal length is specified. Within the specified range, the sixth lens L6 has an appropriate positive refractive force, which enables the system to have better imaging quality and lower sensitivity through a reasonable distribution of optical focal length. In an embodiment, $6.64 \leq f6/f \leq 14.13$ is satisfied.

A radius of curvature of the emitting surface of the sixth lens L6 is R11, and a radius of curvature of the objective surface of the sixth lens L6 is R12. The following relationship expression is satisfied: $0.15 \leq (R11+R12)/(R11-R12) \leq 0.84$, in which the shape of the sixth lens L6 is specified, which is conducive to correcting the problem of on-axis chromatic aberration when it is within the range. In an embodiment, $0.25 \leq (R11+R12)/(R11-R12) \leq 0.67$ is satisfied.

An on-axis thickness of the sixth lens L6 is d11, and the optical total length of the microscope objective lens 10 is TTL. The following relationship expression is satisfied: $0.03 \leq d11/TTL \leq 0.19$, in which a ratio of the on-axis thickness of the sixth lens L6 to the optical total length TTL of the microscope objective lens 10 is specified, which is conducive to controlling the optical total length of the microscope objective lens 10. In an embodiment, $0.04 \leq d11/TTL \leq 0.15$ is satisfied.

In this embodiment, an emitting surface of the seventh lens L7 is concave at a proximal-axis position, and an objective surface thereof is convex at a proximal-axis position, and the seventh lens L7 has a negative bending force. In other embodiments, the emitting surface and the objective surface of the seventh lens L7 may also be set to other concave and convex distributions.

It is defined that the integral focal length of the microscope objective lens 10 is f, and a focal length of the seventh lens L7 is f7. $-9.42 \leq f7/f \leq -1.96$, in which a ratio of the focal length of the seventh lens L7 to the integral focal length is specified. Within the specified range, the seventh lens L7 has an appropriate negative refractive force, which enables the system to have better imaging quality and lower sensitivity through a reasonable distribution of optical focal length. In an embodiment, $-5.89 \leq f7/f \leq -2.45$ is satisfied.

A radius of curvature R13 of the emitting surface of the seventh lens L7, and a radius of curvature R14 of the objective surface of the seventh lens L7. The following relationship expression is satisfied: $-0.78 \leq (R13+R14)/(R13-R14) \leq 0.48$, in which the shape of the seventh lens L7 are specified, which is conducive to correcting the problem of on-axis chromatic aberration when it is within the range. In an embodiment, $-0.49 \leq (R13+R14)/(R13-R14) \leq 0.39$ is satisfied.

An on-axis thickness of the seventh lens L7 is d13, and the optical total length of the microscope objective lens 10 is TTL. The following relationship expression is satisfied: $0.00 \leq d13/TTL \leq 0.08$, which is conducive to controlling the optical total length of the microscope objective lens 10. In an embodiment, $0.01 \leq d13/TTL \leq 0.06$ is satisfied.

In this embodiment, an emitting surface of the eighth lens L8 is convex at a proximal-axis position, an objective surface of the eighth lens L8 is concave at a proximal-axis position, and the eighth lens L8 has a positive refractive force. In other embodiments, the emitting surface and the objective surface of the eighth lens L8 may also be set to other concave and convex distributions.

It is defined that the integral focal length of the microscope objective lens 10 is f, and a focal length of the eighth lens L8 is f8. $2.53 \leq f8/f \leq 14.77$, in which a ratio of the focal length of the eighth lens L8 to the integral focal length is specified. Within the specified range, the eighth lens L8 has an appropriate positive refractive force, which enables the system to have better imaging quality and lower sensitivity through a reasonable distribution of optical focal length. In an embodiment, $4.05 \leq f8/f \leq 11.82$ is satisfied.

A radius of curvature of the emitting surface of the eighth lens L8 is R15, and a radius of curvature of the objective surface of the eighth lens L8 is R16. The following relationship expression is satisfied: $-0.84 \leq (R15+R16)/(R15-R16) \leq 0.35$, in which the shape of the eighth lens L8 is specified, which is conducive to correcting the problem of on-axis chromatic aberration when it is within the range. In an embodiment, $-0.52 \leq (R15+R16)/(R15-R16) \leq 0.28$ is satisfied.

An on-axis thickness of the eighth lens L8 is d15, and the optical total length of the microscope objective lens 10 is TTL. The following relationship expression is satisfied: $0.01 \leq d15/TTL \leq 0.11$, which is conducive to controlling the optical total length of the microscope objective lens 10. In an embodiment, $0.02 \leq d15/TTL \leq 0.08$ is satisfied.

In this embodiment, an emitting surface of the ninth lens L9 is convex at a proximal-axis position, an objective surface of the ninth lens L9 is concave at a proximal-axis position, and the ninth lens L9 has a positive refractive force. In other embodiments, the emitting surface and the objective surface of the ninth lens L9 may also be set to other concave and convex distributions.

It is defined that the integral focal length of the microscope objective lens 10 is f, and the focal length of the ninth lens L9 is f9. $2.16 \leq f9/f \leq 16.16$, in which a ratio of the focal length of the ninth lens L9 to the overall focal length is specified. Within the specified range, the ninth lens L9 has an appropriate positive refractive force, which enables the system to have better imaging quality and lower sensitivity through a reasonable distribution of optical focal length. In an embodiment, $3.46 \leq f9/f \leq 12.93$ is satisfied.

A radius of curvature of the emitting surface of the ninth lens L9 is R17, and a radius of curvature of the objective surface of the ninth lens L9 is R18. The following relationship expression is satisfied: $0.00 \leq (R17+R18)/(R17-R18) \leq 0.46$, in which the shape of the ninth lens L9 is specified, which is conducive to correcting the problem of on-axis chromatic aberration when it is within the range. In an embodiment, $0.00 \leq (R17+R18)/(R17-R18) \leq 0.37$ is satisfied.

An on-axis thickness of the ninth lens L9 is d17, and the optical total length of the microscope objective lens 10 is TTL. The following relationship expression is satisfied: $0.01 \leq d17/TTL \leq 0.13$, which is conducive to controlling the optical total length of the microscope objective lens 10. In an embodiment, $0.02 \leq d17/TTL \leq 0.10$ is satisfied.

In this embodiment, an emitting surface of the tenth lens L10 is concave at a proximal-axis position, the objective surface of the tenth lens L10 is concave at a proximal-axis position, and the tenth lens L10 has a negative refractive force. In other embodiments, the emitting surface and the objective surface of the tenth lens L10 may also be set to other concave and convex distributions.

It is defined that the integral focal length of the microscope objective lens 10 is f, and a focal length of the tenth lens L10 is f10. $-28.09 \leq f10/f \leq -4.24$, in which a ratio of the focal length of the tenth lens L10 to the overall focal length is specified. Within the specified range, the tenth lens L10 has an appropriate negative refractive force, which enables the system to have better imaging quality and lower sensitivity through a reasonable distribution of optical focal length. In an embodiment, $-17.56 \leq f10/f \leq -5.31$ is satisfied.

A radius of curvature of the emitting surface of the tenth lens L10 is R19, and a radius of curvature of the objective surface of the tenth lens L10 is R20. The following relationship expression is satisfied: $-4.47 \leq (R19+R20)/(R19-R20) \leq -1.17$, in which the shape of the tenth lens L10 is specified, which is conducive to correcting the problem of on-axis chromatic aberration when it is within the range. In an embodiment, $-2.79 \leq (R19+R20)/(R19-R20) \leq -1.46$ is satisfied.

An on-axis thickness of the tenth lens L10 is d19, and an optical total length of the microscope objective lens 10 is TTL. The following relationship expression is satisfied: $0.01 \leq d19/TTL \leq 0.15$, which is conducive to controlling the optical total length of the microscope objective lens 10. In an embodiment, $0.01 \leq d19/TTL \leq 0.12$ is satisfied.

In this embodiment, an emitting surface of the eleventh lens L11 is convex at a proximal-axis position, an objective surface of the eleventh lens L11 is convex at a proximal-axis position, and the eleventh lens L11 has a positive refractive force. In other embodiments, the emitting surface and the objective surface of the eleventh lens L11 may also be set to other concave and convex distributions.

It is defined that the integral focal length of the microscope objective lens 10 is f, and a focal length of the eleventh lens L11 is f11. $5.04 \leq f11/f \leq 22.28$, in which a ratio of the focal length of the eleventh lens L11 to the overall focal length is specified. Within the specified range, the eleventh lens L11 has an appropriate positive refractive force, which enables the system to have better imaging quality and lower sensitivity through a reasonable distribution of optical focal length. In an embodiment, $8.07 \leq f11/f \leq 17.82$ is satisfied.

A radius of curvature of the emitting surface of the eleventh lens L11 is R21, and a radius of curvature of the objective surface of the eleventh lens L11 is R22. The following relationship expression is satisfied: $-2.75 \leq (R21+R22)/(R21-R22) \leq -0.01$, in which the shape of the eleventh lens L11 is specified, which is conducive to correcting the problem of on-axis chromatic aberration when it is within the range. In an embodiment, $-1.72 \leq (R21+R22)/(R21-R22) \leq -0.02$ is satisfied.

An on-axis thickness of the eleventh lens L11 is d21, and the optical total length of the microscope objective lens 10 is TTL. The following relationship expression is satisfied: $0.01 \leq d21/TTL \leq 0.09$, which is conducive to controlling the optical total length of the microscope objective lens 10. In an embodiment, $0.01 \leq d21/TTL \leq 0.07$ is satisfied.

In this embodiment, an emitting surface of the twelfth lens L12 is convex at a proximal-axis position, an objective surface of the twelfth lens L12 is convex at a proximal-axis position, and the twelfth lens L12 has a positive refractive force. In other embodiments, the emitting surface and the objective surface of the twelfth lens L12 may also be provided with other concave and convex distributions.

An on-axis thickness of the twelfth lens L12 is d23, and the optical total length of the microscope objective lens 10 is TTL. The following relationship expression is satisfied: $0.02 \leq d23/TTL \leq 0.09$, which is conducive to reasonably controlling the optical total length of the microscope objective lens 10. In an embodiment, $0.03 \leq d23/TTL \leq 0.07$ is satisfied.

When the above relationship expressions are satisfied, the microscope objective lens 10 is made to have good optical performance, and is particularly suitable for the lens with good optical performance, large numerical aperture, and wide working band with 50 times magnification. The working band is 435 nm~700 nm, and the numerical aperture is $NA \geq 0.25$.

When using the microscope objective lens 10, light from an object is incident on the microscope objective lens 10 from the objective surface, and exits from the left side as parallel light. The optical design is the opposite of the optical path, and the parallel light is incident from the left side and then focuses to the right side (objective surface) for imaging.

The microscope objective lens 10 of the present application will be described in the following with examples, and the symbols recorded in each example are shown below, and the units of the focal length, the on-axis distance, the radius of curvature of the center, and the on-axis thickness position are in mm.

TTL: Optical length (on-axis distance from the emitting surface of the first lens L1 to the objective surface) in mm.

Table 1 illustrates the design data of the microscope objective lens 10 of the first embodiment of the present application.

TABLE 1

|  | R | d | nd |  | vd |  |
|---|---|---|---|---|---|---|
| S1 | ∞ | d0 = −44.730 |  |  |  |  |
| R1 | −25.439 | d1 = 1.040 | nd1 | 1.7550 | v1 | 52.34 |
| R2 | 4.810 | d2 = 0.000 |  |  |  |  |
| R3 | 4.810 | d3 = 2.720 | nd2 | 1.9229 | v2 | 18.90 |
| R4 | 6.690 | d4 = 19.500 |  |  |  |  |
| R5 | 49.280 | d5 = 8.220 | nd3 | 1.5691 | v3 | 71.30 |
| R6 | −17.210 | d6 = 0.000 |  |  |  |  |
| R7 | −17.210 | d7 = 1.000 | nd4 | 1.7130 | v4 | 53.83 |
| R8 | 28.900 | d8 = 0.000 |  |  |  |  |
| R9 | 28.900 | d9 = 12.250 | nd5 | 1.5503 | v5 | 75.50 |
| R10 | −20.080 | d10 = 0.290 |  |  |  |  |
| R11 | 73.260 | d11 = 8.470 | nd6 | 1.4370 | v6 | 95.10 |
| R12 | −27.716 | d12 = 0.000 |  |  |  |  |
| R13 | −27.716 | d13 = 1.000 | nd7 | 1.7433 | v7 | 49.24 |
| R14 | 28.9 | d14 = 0.000 |  |  |  |  |
| R15 | 28.9 | d15 = 6.920 | nd8 | 1.4370 | v8 | 95.10 |
| R16 | −39.7 | d16 = 0.180 |  |  |  |  |
| R17 | 32.52 | d17 = 8.540 | nd9 | 1.4378 | v9 | 94.52 |
| R18 | −27.716 | d18 = 0.000 |  |  |  |  |
| R19 | −27.716 | d19 = 1.460 | nd10 | 1.8348 | v10 | 42.73 |
| R20 | −86.27 | d20 = 0.720 |  |  |  |  |
| R21 | 32.52 | d21 = 4.930 | nd11 | 1.5928 | v11 | 68.62 |
| R22 | 389.22 | d22 = 0.200 |  |  |  |  |

TABLE 1-continued

|  | R | d | nd |  | vd |  |
|---|---|---|---|---|---|---|
| R23 | 18.189 | d23 = 5.830 | nd12 | 1.6921 | v12 | 54.54 |
| R24 | 49.28 | d24 = 15.303 |  |  |  |  |

The meaning of each symbol is as follows.

S1: aperture;
R: central radius of curvature at the center of the optical surface;
R1: radius of curvature of the emitting surface of the first lens L1;
R2: radius of curvature of the objective surface of the first lens L1;
R3: radius of curvature of the emitting surface of the second lens L2;
R4: radius of curvature of the objective surface of the second lens L2;
R5: radius of curvature of the emitting surface of the third lens L3;
R6: radius of curvature of the objective surface of the third lens L3;
R7: radius of curvature of the emitting surface of the fourth lens L4;
R8: radius of curvature of the objective surface of the fourth lens L4;
R9: radius of curvature of the emitting surface of the fifth lens L5;
R10: radius of curvature of the objective surface of the fifth lens L5;
R11: radius of curvature of the emitting surface of the sixth lens L6;
R12: radius of curvature of the objective surface of the sixth lens L6;
R13: radius of curvature of the emitting surface of the seventh lens L7;
R14: radius of curvature of the objective surface of the seventh lens L7;
R15: radius of curvature of the emitting surface of the eighth lens L8;
R16: radius of curvature of the objective surface of the eighth lens L8;
R17: radius of curvature of the emitting surface of the ninth lens L9;
R18: radius of curvature of the objective surface of the ninth lens L9;
R19: radius of curvature of the emitting surface of the tenth lens L10;
R20: radius of curvature of the objective surface of the tenth lens L10;
R21: radius of curvature of the emitting surface of the eleventh lens L11;
R22: radius of curvature of the objective surface of the eleventh lens L11;
R23: radius of curvature of the emitting surface of the twelfth lens L12;
R24: radius of curvature of the objective surface of the twelfth lens L12;
d: on-axis thickness of the lens and on-axis distance between the lenses;
d0: on-axis distance from the aperture S1 to the emitting surface of the first lens L1;
d1: on-axis thickness of the first lens L1;
d2: on-axis distance from the objective surface of the first lens L1 to the emitting surface of the second lens L2;
d3: on-axis thickness of the second lens L2;
d4: on-axis distance from the objective surface of the second lens L2 to the emitting surface of the third lens L3;
d5: on-axis thickness of the third lens L3;
d6: on-axis distance from the objective surface of the third lens L3 to the emitting surface of the fourth lens L4;
d7: on-axis thickness of the fourth lens L4;
d8: on-axis distance from the objective surface of the fourth lens L4 to the emitting surface of the fifth lens L5;
d9: on-axis thickness of the fifth lens L5;
d10: on-axis distance from the objective surface of the fifth lens L5 to the emitting surface of the sixth lens L6;
d11: on-axis thickness of the sixth lens L6;
d12: on-axis distance from the objective surface of the sixth lens L6 to the emitting surface of the seventh lens L7;
d13: on-axis thickness of the seventh lens L7;
d14: on-axis distance from the objective surface of the seventh lens L7 to the emitting surface of the eighth lens L8;
d15: on-axis thickness of the eighth lens L8;
d16: on-axis distance from the objective surface of the eighth lens L8 to the emitting surface of the ninth lens L9;
d17: on-axis thickness of the ninth lens L9;
d18: on-axis distance from the objective surface of the ninth lens L9 to the emitting surface of the tenth lens L10;
d19: on-axis thickness of the tenth lens L10;
d20: on-axis distance from the objective surface of the tenth lens L10 to the emitting surface of the eleventh lens L11;
d21: on-axis thickness of the eleventh lens L11;
d22: on-axis distance from the objective surface of the eleventh lens L11 to the emitting surface of the twelfth lens L12;
d23: on-axis thickness of the twelfth lens L12;
d24: on-axis distance from the objective surface of the twelfth lens L12 to the objective surface;
nd: refractive index of the line d;
nd1: refractive index of the line d of the first lens L1;
nd2: refractive index of the line d of the second lens L2;
nd3: refractive index of the line d of the third lens L3;
nd4: the refractive index of the line d of the fourth lens L4;
nd5: the refractive index of the line d of the fifth lens L5;
nd6: refractive index of the line d of the sixth lens L6;
nd7: refractive index of the line d of the seventh lens L7;
nd8: refractive index of the line d of the eighth lens L8;
nd9: refractive index of the line d of the ninth lens L9;
nd10: refractive index of the line d of the tenth lens L10;
nd11: refractive index of the line d of the eleventh lens L11;
nd12: refractive index of the line d of the twelfth lens L12;
vd: Abbe number;
v1: Abbe number of the first lens L1;
v2: Abbe number of the second lens L2;

13

TABLE 1-continued

| R | d | nd | vd |
|---|---|---|---| v3: Abbe number of the third lens L3;
v4: Abbe number of the fourth lens L4;
v5: Abbe number of the fifth lens L5;
v6: Abbe number of the sixth lens L6;
v7: Abbe number of the seventh lens L7;
v8: Abbe number of the eighth lens L8
v9: Abbe number of the ninth lens L9;
v10: Abbe number of the tenth lens L10;
v11: Abbe number of the eleventh lens L11;
v12: Abbe number of the twelfth lens L12.

Figure 2:
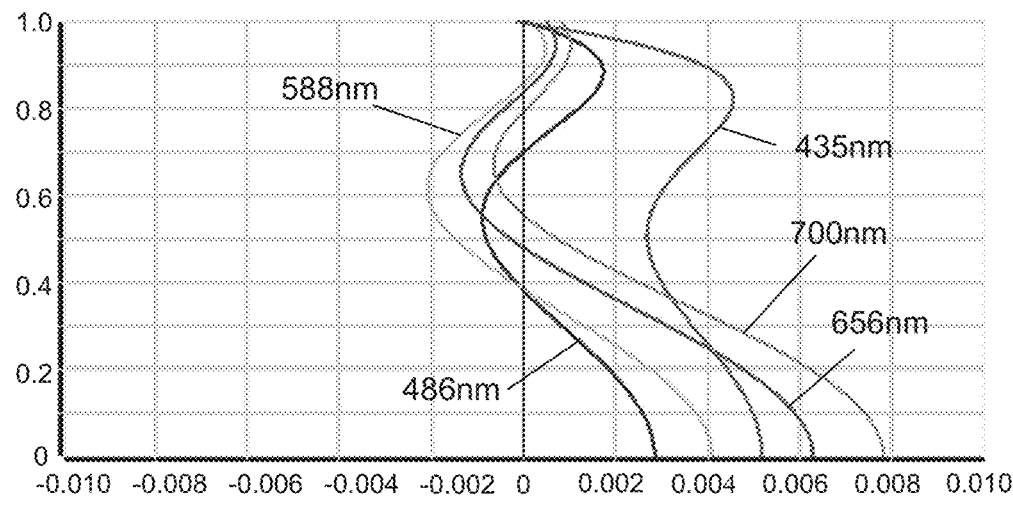
FIG. 2 is a schematic diagram showing the axial aberration of the microscope objective lens shown in FIG. 1.
Figure 3:
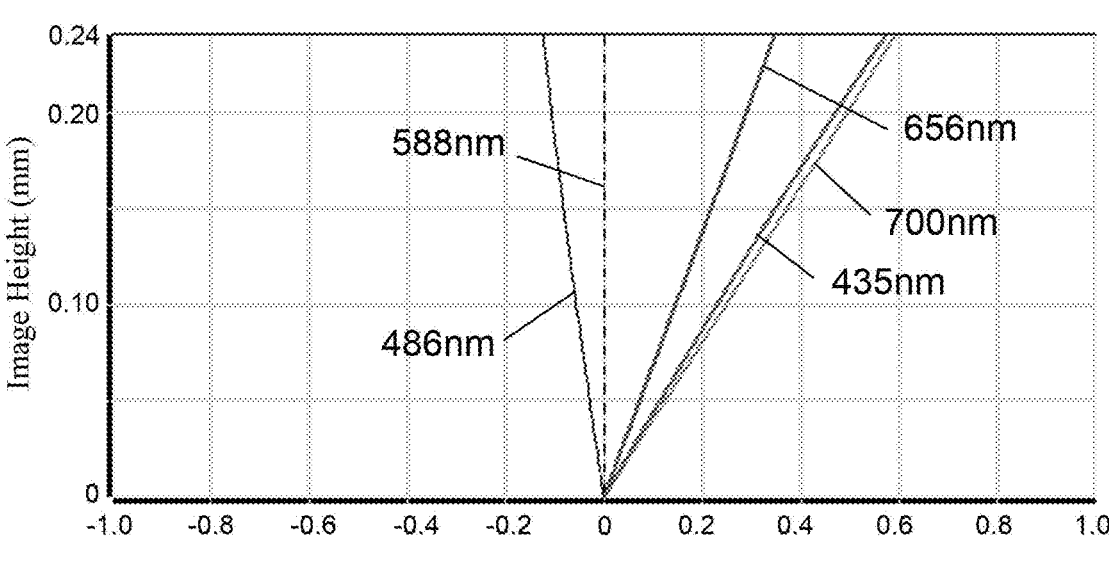
FIG. 3 is a schematic diagram showing the magnification chromatic aberration of the microscope objective lens shown in FIG. 1.
Figure 4:
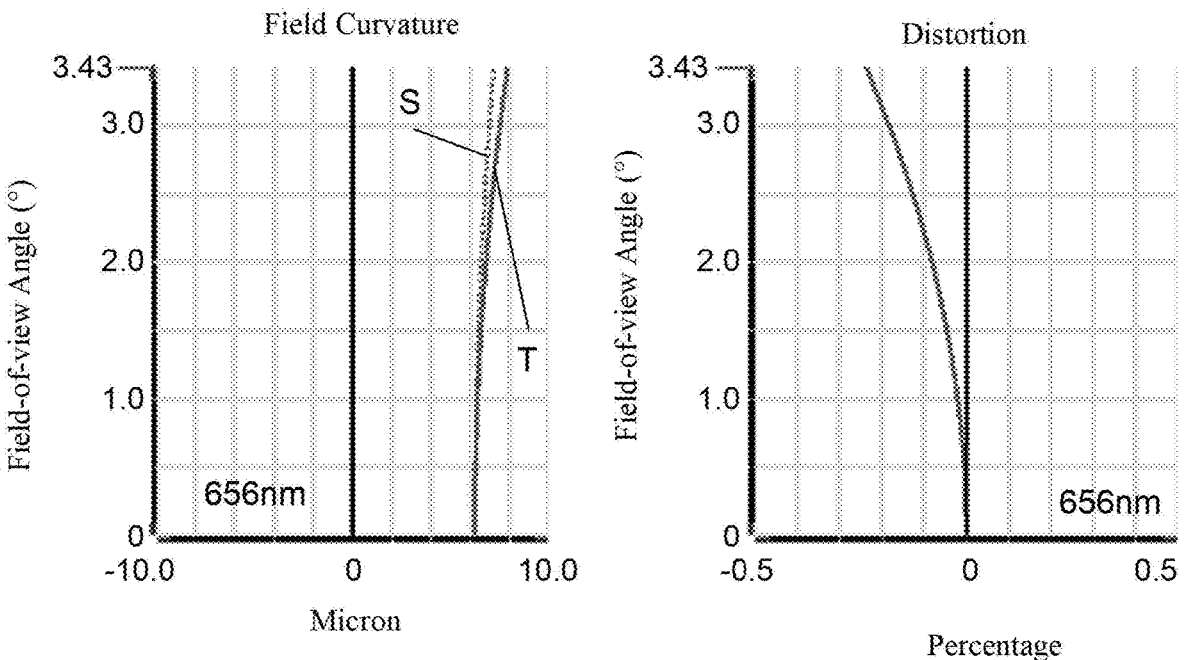
FIG. 4 is a schematic diagram showing the field curvature and distortion of the microscope objective lens shown in FIG. 1.
Figure 5:
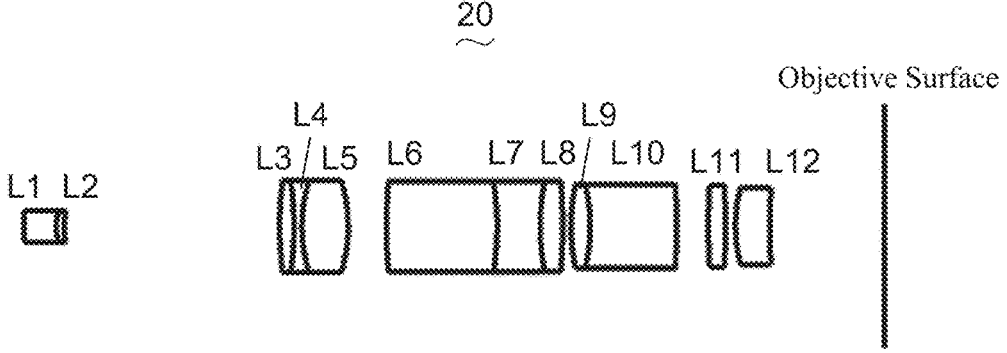
FIG. 5 is a structural schematic diagram of the microscope objective lens according to the second embodiment of the present application.

FIGS. 2 and 3 illustrate the axial aberration and the magnification chromatic aberration of light with wavelengths of 435 nm, 486 nm, 588 nm, 656 nm, and 700 nm, respectively, after passing through the microscope objective lens 10 of the first embodiment. FIG. 4 is a schematic diagram showing the field curvature and distortion of light with a wavelength of 656 nm after passing through the microscope objective lens 10 of the first embodiment. The field curvature S of FIG. 4 is the field curvature in the arc-sagittal direction, and T is the field curvature in the meridional direction.

Table 5 in the following shows the values corresponding to various values in each of the first embodiment, second embodiment, third embodiment, and fourth embodiment with respect to the parameters already specified in the relationship expression. As shown in Table 5, the first embodiment satisfies each of the relationship expressions.

In this embodiment, the microscope objective has an Entrance Pupil Diameter (ENPD) of 4.410 mm, a full-field-of-view image height (IH) of 0.240 mm, a field-of-view angle (FOV) of 6.87° in the diagonal direction, a numerical aperture (NA) of 0.55 mm, a long working distance, and has excellent optical characteristics due to its on-axis and off-axis chromatic aberrations being sufficiently compensated.

Second Embodiment

The second embodiment is substantially the same as the first embodiment, the symbols have the same meaning as that of the first embodiment, and only the differences are listed below.

In this embodiment, the objective surface of the eleventh lens L11 is concave at a proximal-axis position.

Table 2 illustrates the design data of the microscope objective lens 20 of the second embodiment of the present application.

TABLE 2

| | R | d | | nd | | vd |
|---|---|---|---|---|---|---|
| S1 | ∞ | d0 = −41.127 | | | | |
| R1 | −1122.641 | d1 = 4.125 | nd1 | 1.7550 | v1 | 52.34 |
| R2 | 5.017 | d2 = 0.000 | | | | |
| R3 | 5.017 | d3 = 1.008 | nd2 | 1.9229 | v2 | 18.90 |
| R4 | 7.567 | d4 = 27.273 | | | | |
| R5 | 44.391 | d5 = 1.808 | nd3 | 1.5691 | v3 | 71.30 |
| R6 | −38.067 | d6 = 0.000 | | | | |
| R7 | −38.067 | d7 = 1.000 | nd4 | 1.7130 | v4 | 53.83 |
| R8 | 18.045 | d8 = 0.000 | | | | |
| R9 | 18.045 | d9 = 5.912 | nd5 | 1.5503 | v5 | 75.50 |
| R10 | −19.506 | d10 = 4.844 | | | | |
| R11 | 61.449 | d11 = 14.000 | nd6 | 1.4370 | v6 | 95.10 |
| R12 | −32.584 | d12 = 0.000 | | | | |
| R13 | −32.584 | d13 = 5.469 | nd7 | 1.7433 | v7 | 49.24 |
| R14 | 24.331 | d14 = 0.000 | | | | |
| R15 | 24.331 | d15 = 2.907 | nd8 | 1.4370 | v8 | 95.10 |
| R16 | −59.529 | d16 = 1.041 | | | | |

14

TABLE 2-continued

| | R | d | | nd | | vd |
|---|---|---|---|---|---|---|
| R17 | 23.844 | d17 = 2.424 | nd9 | 1.4378 | v9 | 94.52 |
| R18 | −21.078 | d18 = 0.000 | | | | |
| R19 | −21.078 | d19 = 11.000 | nd10 | 1.8348 | v10 | 42.73 |
| R20 | −76.742 | d20 = 4.028 | | | | |
| R21 | 96.931 | d21 = 2.134 | nd11 | 1.5928 | v11 | 68.62 |
| R22 | −100.968 | d22 = 1.280 | | | | |
| R23 | 17.073 | d23 = 4.368 | nd12 | 1.6921 | v12 | 54.54 |
| R24 | 85.232 | d24 = 14.474 | | | | |

Figure 6:
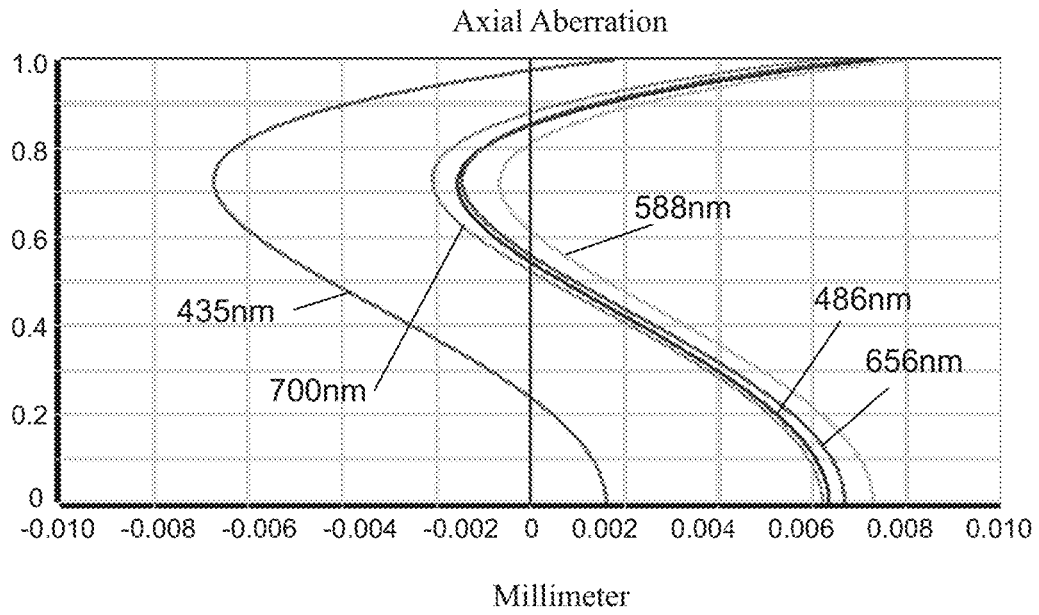
FIG. 6 is a schematic diagram showing the axial aberration of the microscope objective lens shown in FIG. 5.
Figure 7:
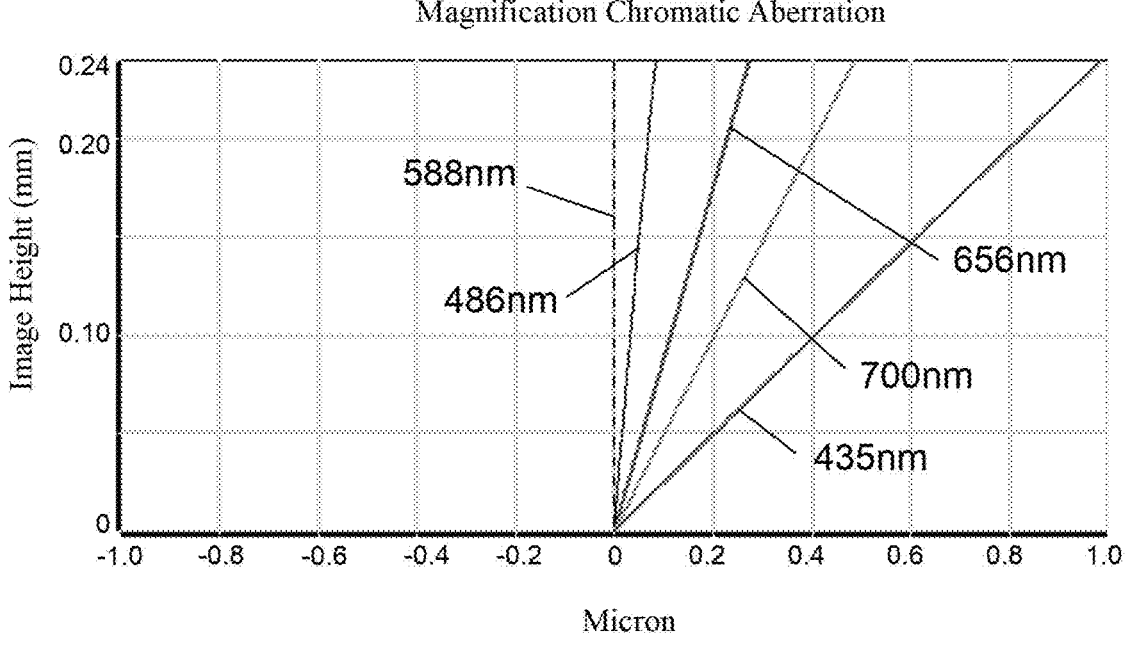
FIG. 7 is a schematic diagram showing the magnification chromatic aberration of the microscope objective lens shown in FIG. 5.
Figure 8:
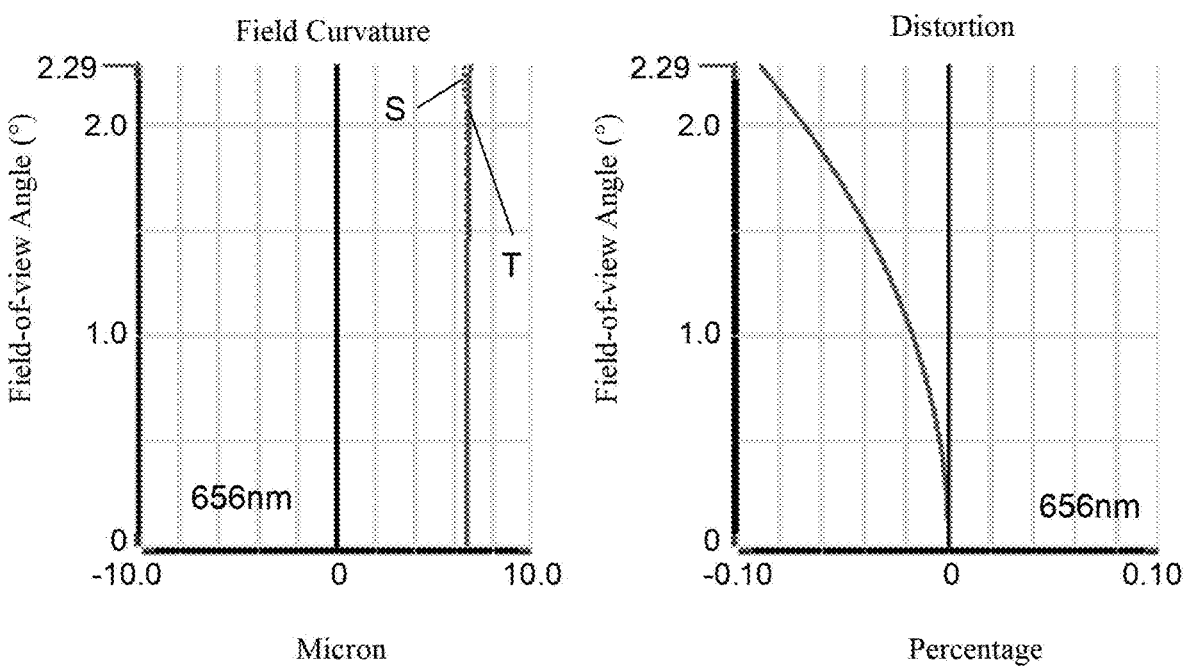
FIG. 8 is a schematic diagram showing the field curvature and distortion of the microscope objective lens shown in FIG. 5.
Figure 9:
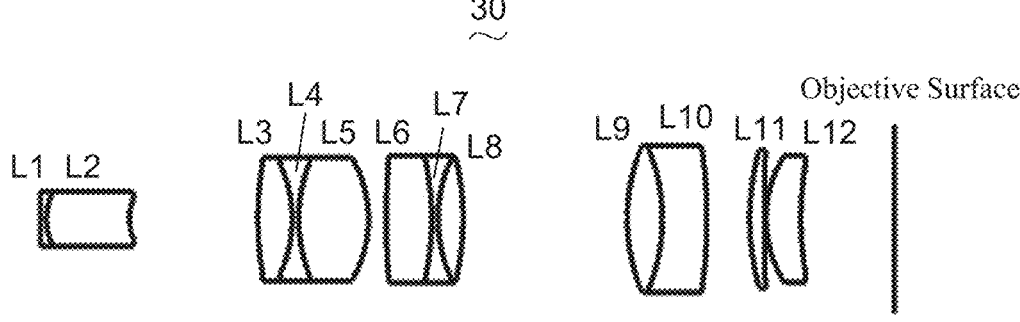
FIG. 9 is a structural schematic diagram of a microscope objective lens according to the third embodiment of the present application.

FIGS. 6 and 7 are schematic diagrams showing axial aberration and magnification chromatic aberration of light with wavelengths of 435 nm, 486 nm, 588 nm, 656 nm, and 700 nm, respectively, after passing through the microscope objective lens 20 of the second embodiment. FIG. 8 is a schematic diagram showing the field curvature and distortion of the light with a wavelength of 656 nm after passing through the microscope objective lens 20 of the second embodiment.

Table 5 in the following lists the values corresponding to each of the relationships in this embodiment in accordance with the above relationships. It is clear that the microscope objective lens 20 of this embodiment satisfies the above-described relationship expressions.

In this embodiment, the microscope objective lens 20 has an ENPD of 2.990 mm, a full field-of-view image height (IH) of 0.240 mm, a field-of-view angle (FOV) of 4.63° in the diagonal direction, a numerical aperture (NA) of 0.25 mm, a long working distance, and has excellent optical characteristics due to its on-axis and off-axis chromatic aberrations being sufficiently compensated.

Third Embodiment

The third embodiment is substantially the same as the first embodiment, the symbols have the same meaning as that of the first embodiment, and only the differences are listed below. In this embodiment, the emitting surface of the first lens L1 is convex at a proximal-axis position.

Table 3 illustrates the design data of the microscope objective lens 30 of the third embodiment of the present application.

TABLE 3

| | R | d | | nd | | vd |
|---|---|---|---|---|---|---|
| S1 | ∞ | d0 = −53.475 | | | | |
| R1 | 105.919 | d1 = 1.000 | nd1 | 1.7550 | v1 | 52.34 |
| R2 | 8.942 | d2 = 0.000 | | | | |
| R3 | 8.942 | d3 = 13.561 | nd2 | 1.9229 | v2 | 18.90 |
| R4 | 7.397 | d4 = 20.855 | | | | |
| R5 | 48.946 | d5 = 5.585 | nd3 | 1.5691 | v3 | 71.30 |
| R6 | −20.204 | d6 = 0.000 | | | | |
| R7 | −20.204 | d7 = 1.045 | nd4 | 1.7130 | v4 | 53.83 |
| R8 | 23.619 | d8 = 0.000 | | | | |
| R9 | 23.619 | d9 = 11.429 | nd5 | 1.5503 | v5 | 75.50 |
| R10 | −19.013 | d10 = 2.879 | | | | |
| R11 | 111.823 | d11 = 7.379 | nd6 | 1.4370 | v6 | 95.10 |
| R12 | −42.672 | d12 = 0.000 | | | | |
| R13 | −42.672 | d13 = 1.017 | nd7 | 1.7433 | v7 | 49.24 |
| R14 | 21.831 | d14 = 0.000 | | | | |
| R15 | 21.831 | d15 = 4.069 | nd8 | 1.4370 | v8 | 95.10 |
| R16 | −41.007 | d16 = 26.733 | | | | |
| R17 | 29.26 | d17 = 5.812 | nd9 | 1.4378 | v9 | 94.52 |
| R18 | −29.294 | d18 = 0.000 | | | | |
| R19 | −29.294 | d19 = 7.233 | nd10 | 1.8348 | v10 | 42.73 |
| R20 | −76.699 | d20 = 6.953 | | | | |
| R21 | 40.292 | d21 = 2.433 | nd11 | 1.5928 | v11 | 68.62 |
| R22 | 600.375 | d22 = 0.200 | | | | |

TABLE 3-continued

| | R | d | | nd | | vd |
|---|---|---|---|---|---|---|
| R23 | 18.576 | d23 = 5.640 | nd12 | 1.6921 | v12 | 54.54 |
| R24 | 48.665 | d24 = 15.216 | | | | |

Figure 10:
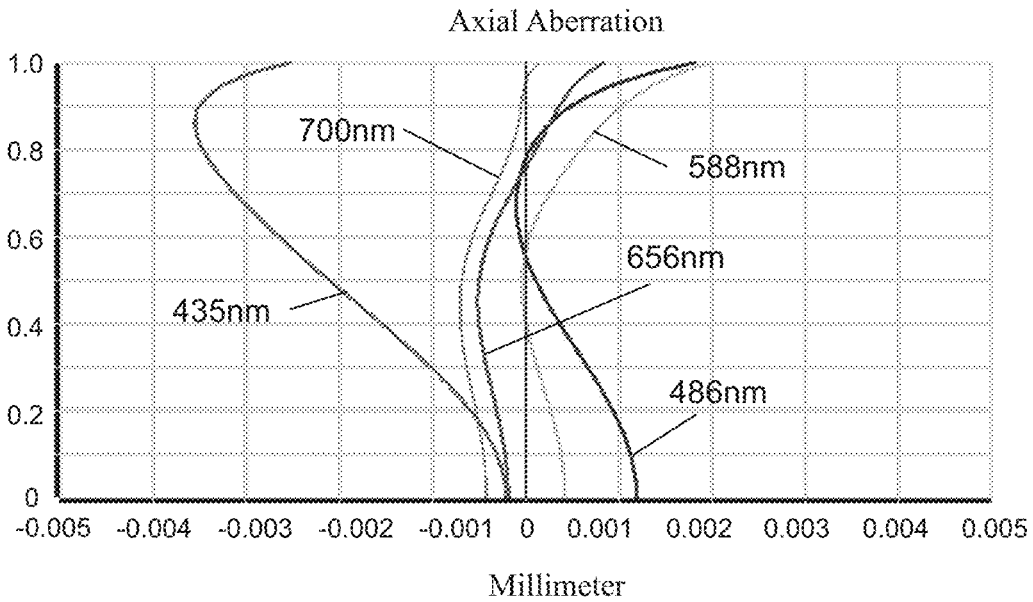
FIG. 10 is a schematic diagram showing the axial aberration of the microscope objective lens shown in FIG. 9.
Figure 11:
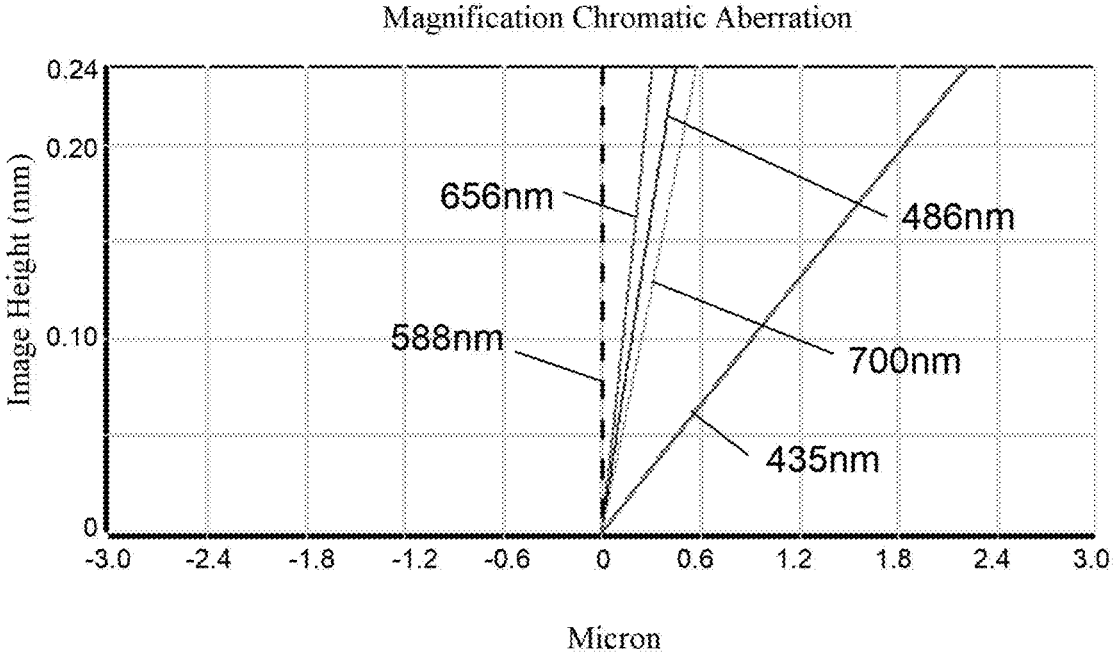
FIG. 11 is a schematic diagram showing the magnification chromatic aberration of the microscope objective lens shown in FIG. 9.
Figure 12:
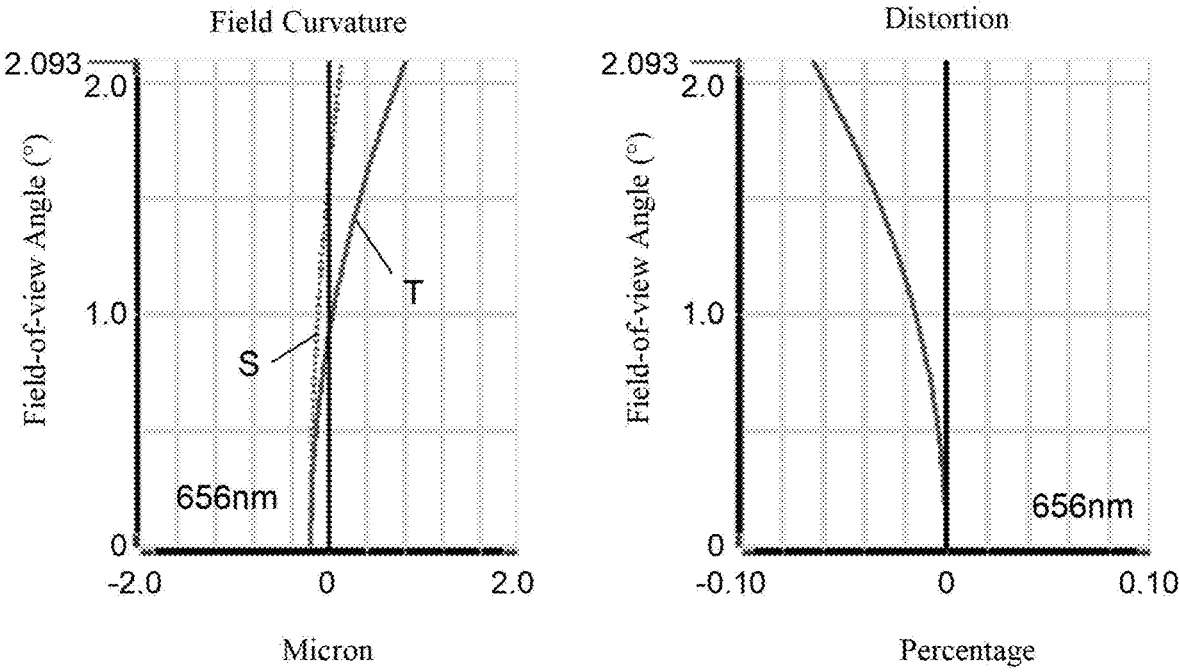
FIG. 12 is a schematic diagram showing the field curvature and distortion of the microscope objective lens shown in FIG. 9.
Figure 13:
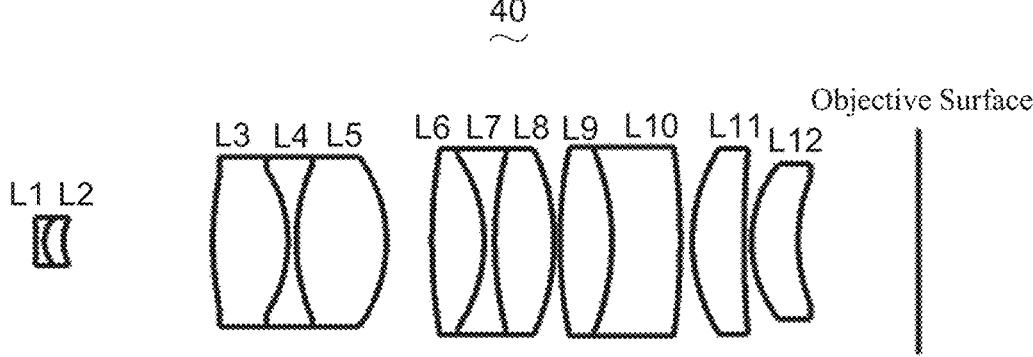
FIG. 13 is a structural schematic diagram of the microscope objective lens according to the fourth embodiment of the present application.

FIGS. 10 and 11 are schematic diagrams showing axial aberration and magnification chromatic aberration of light with wavelengths of 435 nm, 486 nm, 588 nm, 656 nm, and 700 nm, respectively, after passing through the third embodiment of the microscope objective lens 30. FIG. 12 illustrates a schematic diagram of field curvature and distortion of light with a wavelength of 656 nm after passing through the microscope objective lens 30 of the third embodiment.

Table 5 in the following lists the values corresponding to each of the relationships in this embodiment in accordance with the above relationships. It is clear that the microscope objective lens 30 of this embodiment satisfies the above-described relationship expression.

In this embodiment, the microscope objective lens 30 has an ENPD of 5.870 mm, a full field-of-view image height (IH) of 0.240 mm, a field-of-view angle (FOV) of 3.34° in the diagonal direction, a numerical aperture (NA) of 0.456 mm, a long working distance, and has excellent optical characteristics due to its on-axis and off-axis chromatic aberrations being sufficiently compensated.

Fourth Embodiment

The fourth embodiment is essentially the same as the first embodiment, the meaning of the symbols is the same as the first embodiment, and only the differences are listed below.

Table 4 illustrates the design data of the microscope objective lens 40 of embodiment four of the present application.

TABLE 4

| | R | d | | nd | | vd |
|---|---|---|---|---|---|---|
| S1 | ∞ | d0 = −45.156 | | | | |
| R1 | −30.946 | d1 = 1.067 | nd1 | 1.7550 | v1 | 52.34 |
| R2 | 4.705 | d2 = 0.000 | | | | |
| R3 | 4.705 | d3 = 2.406 | nd2 | 1.9229 | v2 | 18.90 |
| R4 | 6.768 | d4 = 19.319 | | | | |
| R5 | 47.658 | d5 = 9.624 | nd3 | 1.5691 | v3 | 71.30 |
| R6 | −18.522 | d6 = 0.000 | | | | |
| R7 | −18.522 | d7 = 1.086 | nd4 | 1.7130 | v4 | 53.83 |
| R8 | 27.158 | d8 = 0.000 | | | | |
| R9 | 27.158 | d9 = 11.654 | nd5 | 1.5503 | v5 | 75.50 |
| R10 | −19.809 | d10 = 5.848 | | | | |
| R11 | 76.128 | d11 = 6.699 | nd6 | 1.4370 | v6 | 95.10 |
| R12 | −21.590 | d12 = 0.000 | | | | |
| R13 | −21.59 | d13 = 1.369 | nd7 | 1.7433 | v7 | 49.24 |
| R14 | 48.985 | d14 = 0.000 | | | | |
| R15 | 48.985 | d15 = 7.632 | nd8 | 1.4370 | v8 | 95.10 |
| R16 | −30.604 | d16 = 0.775 | | | | |
| R17 | 63.412 | d17 = 6.721 | nd9 | 1.4378 | v9 | 94.52 |
| R18 | −33.408 | d18 = 0.000 | | | | |
| R19 | −33.408 | d19 = 8.877 | nd10 | 1.8348 | v10 | 42.73 |
| R20 | −93.891 | d20 = 1.558 | | | | |
| R21 | 24.326 | d21 = 6.609 | nd11 | 1.5928 | v11 | 68.62 |
| R22 | 154.697 | d22 = 0.997 | | | | |
| R23 | 17.438 | d23 = 5.953 | nd12 | 1.6921 | v12 | 54.54 |
| R24 | 23.251 | d24 = 15.500 | | | | |

Figure 14:
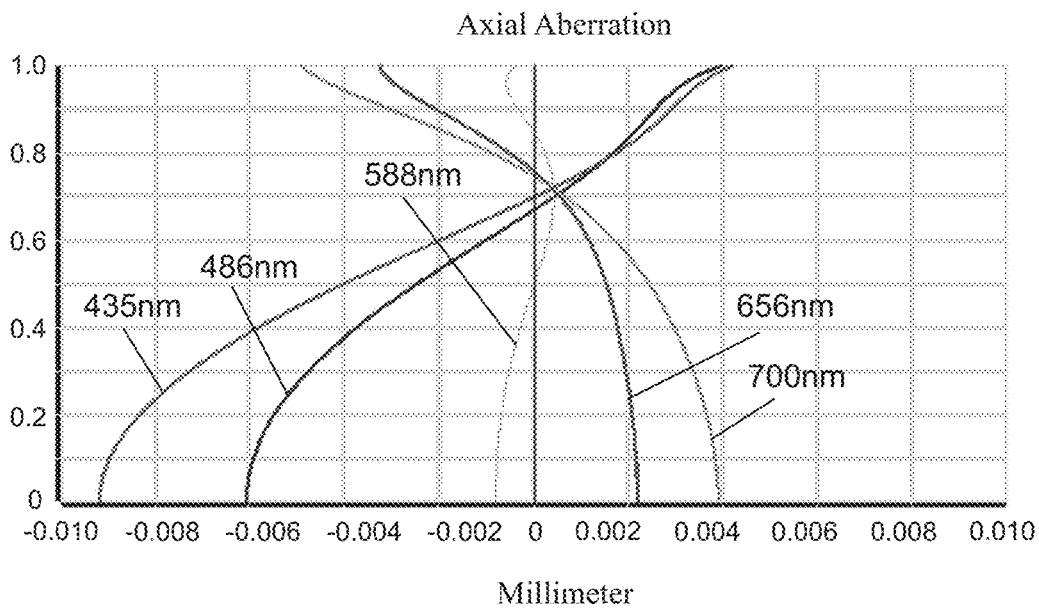
FIG. 14 is a schematic diagram showing the axial aberration of the microscope objective lens shown in FIG. 13.
Figure 15:
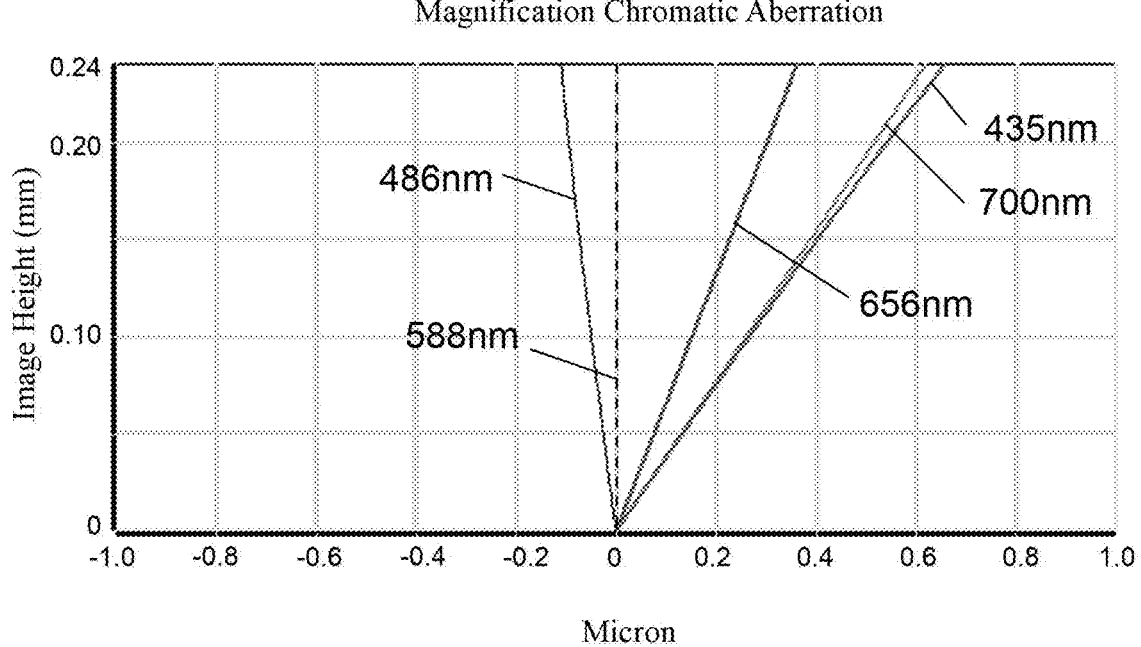
FIG. 15 is a schematic diagram showing the magnification chromatic aberration of the microscope objective lens shown in FIG. 13.
Figure 16:
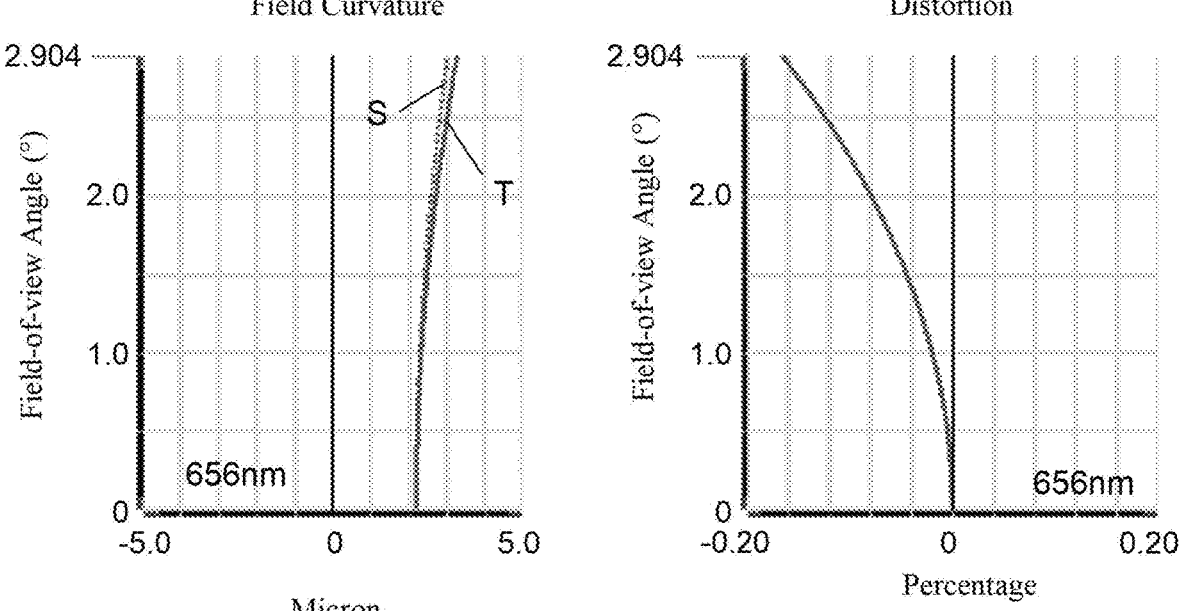
FIG. 16 is a schematic diagram showing the field curvature and distortion of the microscope objective lens shown in FIG. 13.

FIGS. 14 and 15 are schematic diagrams showing axial aberration and magnification chromatic aberration of light with wavelengths of 435 nm, 486 nm, 588 nm, 656 nm, and 700 nm, respectively, after passing through the microscope objective lens 40 of the fourth embodiment. FIG. 16 shows a schematic diagram showing the field curvature and distortion of light having a wavelength of 656 nm after passing through the microscope objective lens 40 of the fourth embodiment.

Table 5 in the following lists the values corresponding to each of the relationship expressions in this embodiment according to the above relationship expressions. It is clear that the microscope objective lens 40 of this embodiment satisfies the above-described relationship expression.

In this embodiment, the microscope objective lens 40 described herein has an ENPD of 4.410 mm, a full field-of-view image height (IH) of 0.240 mm, a field-of-view angle (FOV) of 7.38° in the diagonal direction, and a numerical aperture NA of 0.47 mm, a long working distance, and has excellent optical characteristics due to its on-axis and off-axis chromatic aberrations being sufficiently compensated.

TABLE 5

| Parameters and relationship expressions | First Embodiment | Second Embodiment | Third Embodiment | Fourth Embodiment |
|---|---|---|---|---|
| NA*f | 2.21 | 1.50 | 3.00 | 2.23 |
| d4/TTL | 0.20 | 0.25 | 0.15 | 0.17 |
| f12/f | 9.65 | 5.00 | 6.14 | 14.99 |
| (R23 + R24)/ (R23 − R24) | −2.17 | −1.50 | −2.24 | −7.00 |
| f11/f9_10 | 0.55 | 0.89 | 0.90 | 0.20 |
| WD/f | 3.82 | 2.41 | 2.32 | 3.27 |
| f | 4.010 | 6.008 | 6.570 | 4.739 |
| f1 | −5.280 | −6.605 | −12.994 | −5.341 |
| f2 | 10.946 | 13.559 | 14.442 | 10.727 |
| f3 | 23.467 | 36.300 | 25.889 | 24.744 |
| f4 | −14.993 | −17.043 | −15.123 | −15.293 |
| f5 | 23.627 | 18.041 | 21.154 | 22.824 |
| f6 | 47.219 | 51.036 | 71.719 | 39.308 |
| f7 | −18.891 | −18.003 | −19.300 | −19.995 |
| f8 | 39.483 | 39.945 | 33.255 | 44.398 |
| f9 | 35.720 | 25.982 | 34.478 | 51.057 |
| f10 | −49.477 | −38.249 | −61.010 | −66.569 |
| f11 | 59.551 | 83.758 | 72.738 | 47.789 |
| f12 | 38.688 | 30.059 | 40.317 | 71.032 |
| f9_10 | 108.78 | 93.96 | 80.91 | 237.75 |
| NA | 0.55 | 0.25 | 0.456 | 0.47 |
| WD | 15.30 | 14.47 | 15.22 | 15.50 |
| IH | 0.240 | 0.240 | 0.240 | 0.240 |
| FOV | 6.87° | 4.63° | 3.34° | 7.38° |
| TTL | 98.57 | 109.1 | 139.04 | 113.69 |

FOV: field-of-view in the diagonal direction of the microscope objective lens 40.

It can be understood by those of ordinary skill in the art that each of the above embodiments is a specific embodiment for realizing the present application, and that various changes can be made thereto in form and detail in practical application without departing from the spirit and scope of the present application.

What is claimed is:

1. A microscope objective lens, comprising in order from an emitting side to an objective side: a first lens, a second lens, a third lens, a fourth lens, a fifth lens, a sixth lens, a seventh lens, an eighth lens, a ninth lens, a tenth lens, an eleventh lens, and a twelfth lens;

wherein a numerical aperture is NA; a focal length of the microscope objective lens is f; an air spacing between the second lens and the third lens on an optical axis is d4; an optical total length of the microscope objective lens is TTL; a focal length of the twelfth lens is f12; a central radius of curvature of an emitting surface of the twelfth lens is R23; a central radius of curvature of an objective surface of the twelfth lens is R24, and the following relationship expressions are satisfied:

$$1.50 \le NA * f \le 3.00;$$

$$0.15 \le d4/TTL \le 0.25;$$

$$5.00 \le f12/f \le 15.00;$$

$$-7.00 \le (R23 + R24)/(R23 - R24) \le -1.50.$$

2. The microscope objective lens of claim 1, wherein a focal length of the eleventh lens is f11; a focal length of a combined lens formed by gluing the ninth lens and the tenth lens to each other is f9_10, and the following relationship expression is satisfied:

$$0.20 \le f11/f9\_10 \le 0.90.$$

3. The microscope objective lens of claim 1, wherein a distance from the objective surface of the twelfth lens to an objective surface of the microscope objective lens is WD, and the following relationship expression is satisfied:

$$2.30 \le WD/f \le 3.30.$$

4. The microscope objective lens of claim 1, wherein an objective surface of the first lens is convex at a proximal-axis position;
   a focal length of the first lens is f1; a central radius of curvature of an emitting surface of the first lens is R1; a central radius of curvature of an objective surface of the first lens is R2; an on-axis thickness of the first lens is d1, and the following relationship expressions are satisfied:

$$-3.96 \le f1/f \le -0.73;$$

$$0.34 \le (R1 + R2)/(R1 - R2) \le 1.78;$$

$$0.00 \le d1/TTL \le 0.06.$$

5. The microscope objective lens of claim 1, wherein an emitting surface of the second lens is convex at a proximal-axis position, and an objective surface of the second lens is convex at a proximal-axis position;
   a focal length of the second lens is f2; a central radius of curvature of the emitting surface of the second lens is R3; a central radius of curvature of the objective surface of the second lens is R4; an on-axis thickness of the second lens is d3, and the following relationship expressions are satisfied:

$$1.10 \le f2/f \le 4.09;$$

$$-12.23 \le (R3 + R4)/(R3 - R4) \le 15.86;$$

$$0.00 \le d3/TTL \le 0.15.$$

6. The microscope objective lens of claim 1, wherein an emitting surface of the third lens is convex at a proximal-axis position, and an objective surface of the third lens is concave at a proximal-axis position;
   a focal length of the third lens is f3; a central radius of curvature of the emitting surface of the third lens is R5; a central radius of curvature of the objective surface of the third lens is R6; an on-axis thickness of the third lens is d5, and the following relationship expressions are satisfied:

$$1.97 \le f3/f \le 9.06;$$

$$0.04 \le (R5 + R6)/(R5 - R6) \le 0.72;$$

$$0.01 \le d5/TTL \le 0.13.$$

7. The microscope objective lens of claim 1, wherein an emitting surface of the fourth lens is concave at a proximal-axis position, and an objective surface of the fourth lens is convex at a proximal-axis position;
   a focal length of the fourth lens is f4; a central radius of curvature of the emitting surface of the fourth lens is R7; a central radius of curvature of the objective surface of the fourth lens is R8; an on-axis thickness of the fourth lens is d7, and the following relationship expressions are satisfied:

$$-7.48 \le f4/f \le -1.53;$$

$$-0.51 \le (R7 + R8)/(R7 - R8) \le 0.54;$$

$$0.00 \le d7/TTL \le 0.02.$$

8. The microscope objective lens of claim 1, wherein an emitting surface of the fifth lens is convex at a proximal-axis position, and an objective surface of the fifth lens is concave at a proximal-axis position;
   a focal length of the fifth lens is f5; a central radius of curvature of the emitting surface of the fifth lens is R9; a central radius of curvature of the objective surface of the fifth lens is R10; an on-axis thickness of the fifth lens is d9, and the following relationship expressions are satisfied:

$$1.50 \le f5/f \le 8.84;$$

$$-0.08 \le (R9 + R10)/(R9 - R10) \le 0.27;$$

$$0.03 \le d9/TTL \le 0.19.$$

9. The microscope objective lens of claim 1, wherein an emitting surface of the sixth lens is convex at a proximal-axis position, and an objective surface of the sixth lens is concave at a proximal-axis position;
   a focal length of the sixth lens is f6; a central radius of curvature of the emitting surface of the sixth lens is R11; a central radius of curvature of the objective surface of the sixth lens is R12; an on-axis thickness of the sixth lens is d11, and the following relationship expressions are satisfied:

$$4.15 \le f6/f \le 17.66;$$

$$0.15 \le (R11 + R12)/(R11 - R12) \le 0.84;$$

$$0.03 \le d11/TTL \le 0.19.$$

10. The microscope objective lens of claim 1, wherein an emitting surface of the seventh lens is concave at a proximal-axis position, and an objective surface of the seventh lens is convex at a proximal-axis position;

a focal length of the seventh lens is f7; a central radius of curvature of the emitting surface of the seventh lens is R13; a central radius of curvature of the objective surface of the seventh lens is R14; an on-axis thickness of the seventh lens is d13, and the following relationship expressions are satisfied:

$$-9.42 \le f7/f \le -1.96;$$

$$-0.78 \le (R13 + R14)/(R13 - R14) \le 0.48;$$

$$0.00 \le d13/TTL \le 0.08.$$

11. The microscope objective lens of claim 1, wherein an emitting surface of the eighth lens is convex at a proximal-axis position, and an objective surface of the eighth lens is concave at a proximal-axis position;

a focal length of the eighth lens is f8; a central radius of curvature of the emitting surface of the eighth lens is R15; a central radius of curvature of the objective surface of the eighth lens is R16; an on-axis thickness of the eighth lens is d15, and the following relationship expressions are satisfied:

$$2.53 \le f8/f \le 14.77;$$

$$-0.84 \le (R15 + R16)/(R15 - R16) \le 0.35;$$

$$0.01 \le d15/TTL \le 0.11.$$

12. The microscope objective lens of claim 1, wherein an emitting surface of the ninth lens is convex at a proximal-axis position, and an objective surface of the ninth lens is concave at a proximal-axis position;

a focal length of the ninth lens is f9; a central radius of curvature of the emitting surface of the ninth lens is R17; a central radius of curvature of the objective surface of the ninth lens is R18; an on-axis thickness of the ninth lens is d17, and the following relationship expressions are satisfied:

$$2.16 \le f9/f \le 16.16;$$

$$0.00 \le (R17 + R18)/(R17 - R18) \le 0.46;$$

$$0.01 \le d17/TTL \le 0.13.$$

13. The microscope objective lens of claim 1, wherein an emitting surface of the tenth lens is concave at a proximal-axis position, and an objective surface of the tenth lens is concave at a proximal-axis position;

a focal length of the tenth lens is f10; a central radius of curvature of the emitting surface of the tenth lens is R19; a central radius of curvature of the objective surface of the tenth lens is R20; an on-axis thickness of the tenth lens is d19, and the following relationship expressions are satisfied:

$$-28.09 \le f10/f \le -4.24;$$

$$-4.47 \le (R19 + R20)/(R19 - R20) \le -1.17;$$

$$0.01 \le d19/TTL \le 0.15.$$

14. The microscope objective lens of claim 1, wherein an emitting surface of the eleventh lens is convex at a proximal-axis position;

a central radius of curvature of the emitting surface of the eleventh lens is R21; a central radius of curvature of an objective surface of the eleventh lens is R22; an on-axis thickness of the eleventh lens is d21, and the following relationship expressions are satisfied:

$$5.04 \le f11/f \le 22.28;$$

$$-2.75 \le (R21 + R22)/(R21 - R22) \le -0.01;$$

$$0.01 \le d21/TTL \le 0.09.$$

15. The microscope objective lens of claim 1, wherein the emitting surface of the twelfth lens is convex at a proximal-axis position, and the objective surface of the twelfth lens is convex at a proximal-axis position;

an on-axis thickness of the twelfth lens is d23, and the following relationship expressions are satisfied:

$$2.50 \le f12/f \le 22.48;$$

$$0.02 \le d23/TTL \le 0.09.$$

16. The microscope objective lens of claim 1, wherein the optical total length TTL of the microscope objective lens is less than or equal to 143.21 mm.

*    *    *    *    *